United States Patent [19]

Chen

[11] Patent Number: 5,038,378

[45] Date of Patent: Aug. 6, 1991

[54] METHOD AND APPARATUS FOR SMOOTHING MEASUREMENTS AND DETECTING BOUNDARIES OF FEATURES

[75] Inventor: Min-Yi Chen, West Redding, Conn.

[73] Assignee: Schlumberger Technology Corporation, New York, N.Y.

[21] Appl. No.: 253,385

[22] Filed: Oct. 3, 1988

Related U.S. Application Data

[63] Continuation of Ser. No. 727,655, Apr. 26, 1985, abandoned.

[51] Int. Cl.$^5$ .............................................. G06K 9/00
[52] U.S. Cl. .................................. 382/1; 346/33 WL; 364/422; 367/33; 367/69; 382/22; 382/54
[58] Field of Search .................... 382/1, 22, 23, 54; 364/422; 367/33, 69; 346/33 WL

[56] References Cited

U.S. PATENT DOCUMENTS

| | | | |
|---|---|---|---|
| 3,624,606 | 11/1971 | Lefevre | 382/21 |
| 3,728,672 | 4/1973 | Dennis | 367/69 |
| 4,124,870 | 11/1978 | Schatz | 382/54 |
| 4,320,458 | 3/1982 | Vincent | 324/323 |
| 4,399,461 | 8/1983 | Powell | 382/54 |
| 4,468,623 | 8/1984 | Gianzero et al. | 324/367 |
| 4,499,598 | 2/1985 | Chittineni | 382/54 |
| 4,541,275 | 9/1985 | Kerzner | 364/422 |
| 4,543,648 | 9/1985 | Hsu | 367/33 |
| 4,594,691 | 6/1986 | Kimball et al. | 367/32 |
| 4,607,352 | 8/1985 | Seeman | 346/33 WL |
| 4,638,254 | 1/1987 | Uhri | 364/422 |
| 4,646,240 | 2/1987 | Serra | 364/422 |

OTHER PUBLICATIONS

"Semblance processing of borehole acoustic array data" *Geophysics*, vol. 49, No. 3, pp. 274–281 (Mar. 1984) by Kimball et al.

*Primary Examiner*—Leo H. Boudeau
*Attorney, Agent, or Firm*—Louis H. Reens; Leonard W. Pojunas

[57] ABSTRACT

A method and apparatus are described for removing noise by smoothing fine resistivity measurements made with a tool from inside a borehole penetrating an earth formation. Pixel values representative of the resistivity measurements are examined to determine the directions of features in the measurements and a smoothing of the pixel values is then made along the measured directions. The orientations of the features are obtained with a similarlity investigation of pixels in sub-array windows along parallel lines whose slope is varied. Optimal slope lines along which the pixel values in a window best resemble each other are determined as the direction of the features. Smoothing is done along the optimal slope lines. Substantially noise free pixel measurements are obtained to enable subsequent automatic signal processing such as the detection of edges between layers of different resistivity. The edges are recorded with an emphasis on a visual display for enhanced visual analysis.

48 Claims, 5 Drawing Sheets

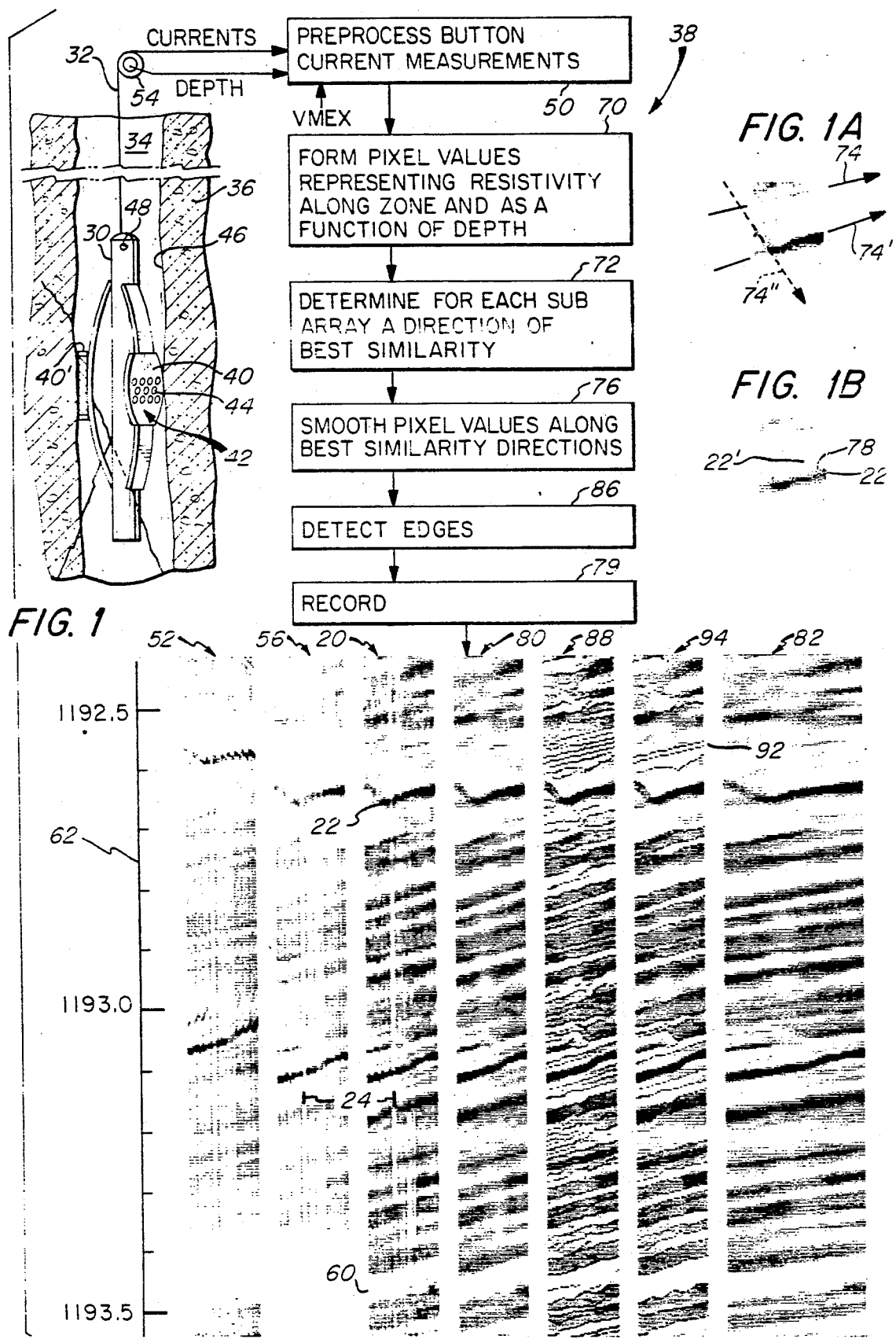

BEST AVAILABLE COPY
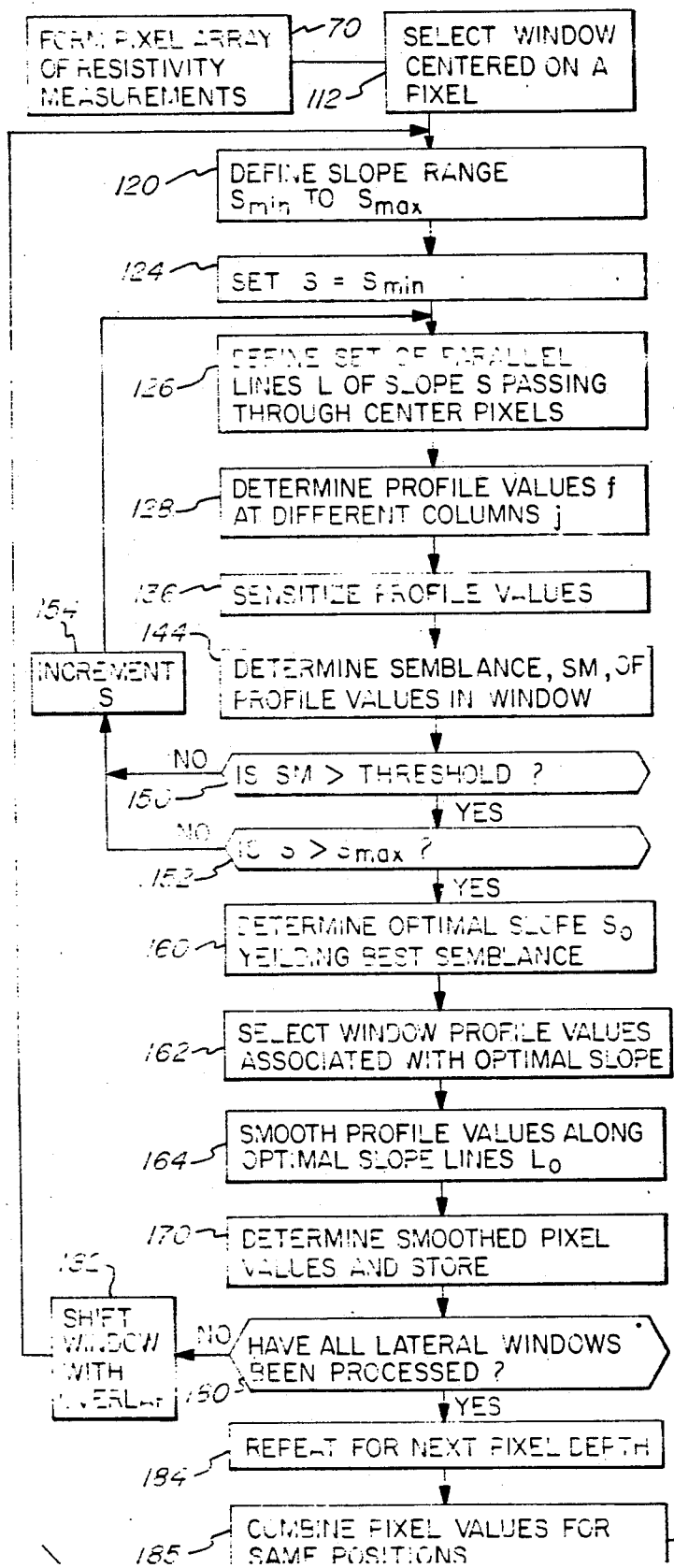
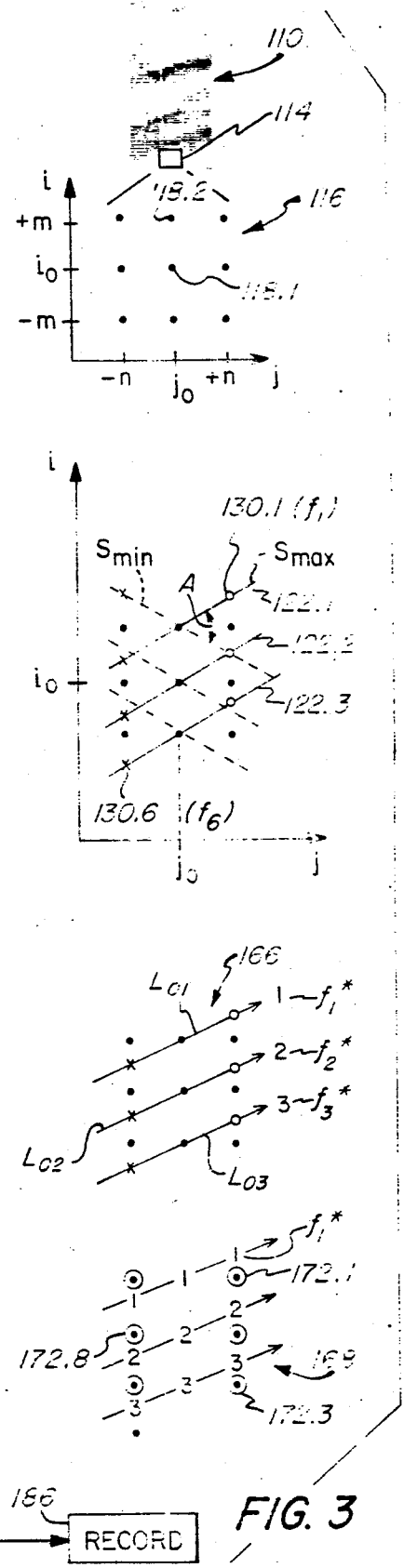
FIG. 3

```
                    ┌──────────────────────────┐
            ────────▶│  FORM PIXEL MEASUREMENTS │──100
                    └──────────────────────────┘
                                  │
                                  ▼
                    ┌──────────────────────────┐
                    │ DETERMINE THE DIRECTIONS OF │
                    │ BEST RESEMBLANCE OF THE    │──102
                    │ PIXEL MEASUREMENTS         │
                    └──────────────────────────┘
                                  │
                                  ▼
                    ┌──────────────────────────┐
                    │ SMOOTH PIXEL MEASUREMENTS │
                    │ ALONG DIRECTIONS OF BEST  │──104
                    │ RESEMBLANCE               │
                    └──────────────────────────┘
                                  │
                                  ▼
                            ┌─────────┐
                            │ RECORD  │         FIG. 2
                            └─────────┘
```

*FIG. 4*

DEMEAN PROFILE VALUES —140

WHERE $C_j$ IS CHOSEN SO THAT $$\sum_{i=-m}^{i=+m} F_{j,s}(i) \cong 0$$

$$SM = \frac{\displaystyle\sum_{i=-m}^{i=m} \left| \sum_{j=-n}^{j=n} F_{j,s}(i) \right|^2}{\displaystyle\sum_{i=-m}^{i=m} (2n+1) \cdot \sum_{j=-n}^{j=n} \left| F_{j,s}(i) \right|^2}$$

146

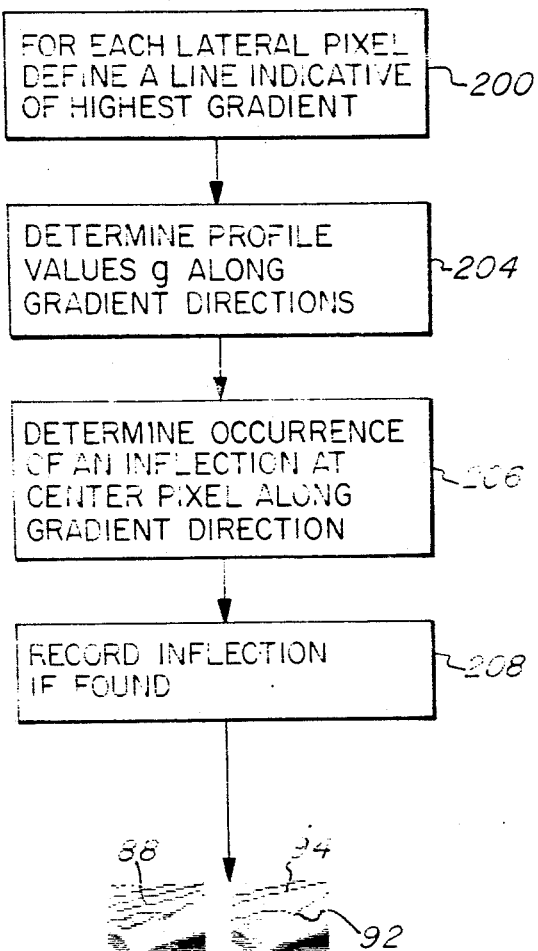
FIG. 7
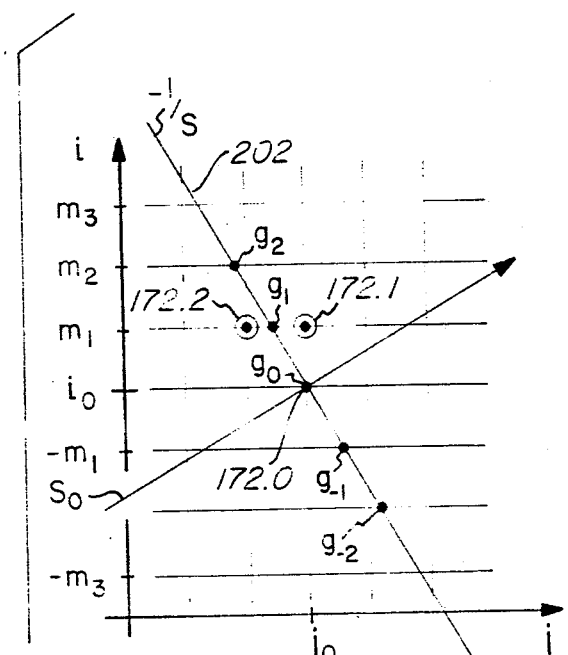
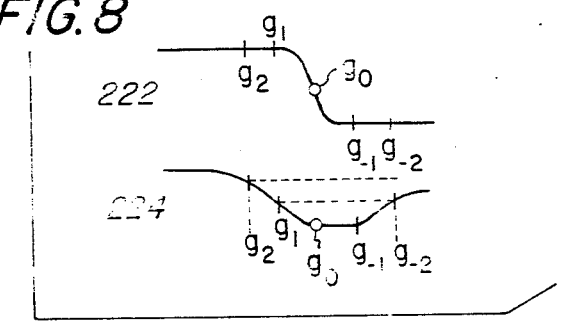
FIG. 8
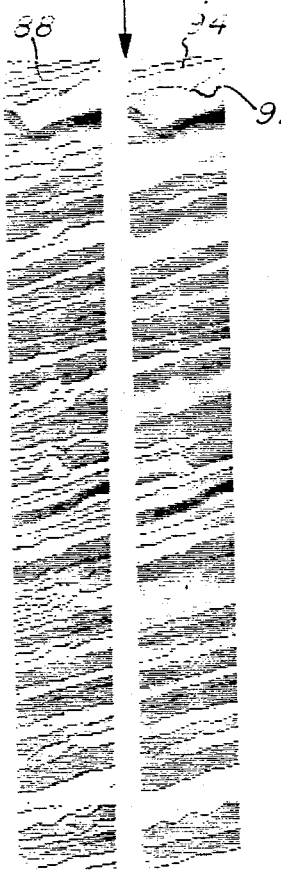
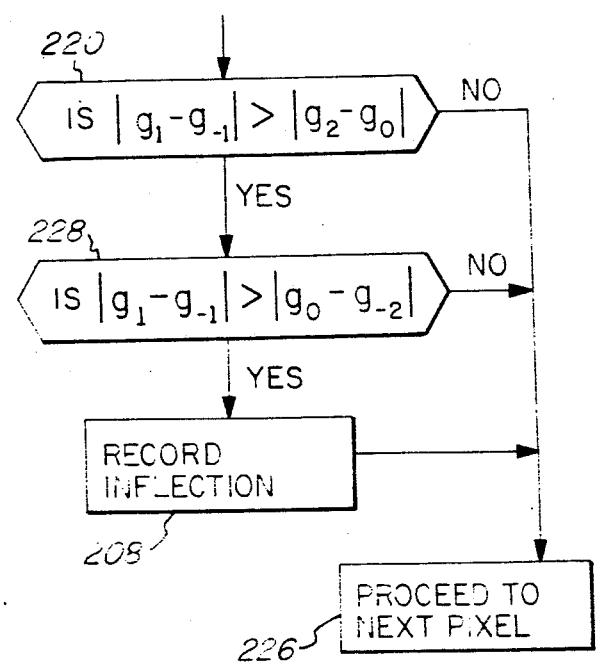
FIG. 9

METHOD AND APPARATUS FOR SMOOTHING MEASUREMENTS AND DETECTING BOUNDARIES OF FEATURES

This is a continuation of copending application Ser. No. 06/727,655 filed on Apr. 26, 1985, now abandoned.

FIELD OF THE INVENTION

This invention generally relates to a method and apparatus for smoothing measurements and more specifically to the smoothing of measurements representative of an investigation of an earth formatiom from inside a borehole. This invention further relates to a method and apparatus for the detection in such smoothed measurements of features such as objects, layers, beds, fractures and the like.

BACKGROUND OF THE INVENTION

In U.S. Pat. No. 4,468,623 to Gianzero et al a method and apparatus are described with which fine resistivity measurements are made with an array of small button electrodes. With such array it then becomes possible to obtain a display log as illustrated in and using the techniques described in a copending patent application entitled Method And Apparatus For Producing An Image Log Of A Wall Of A Borehole Penetrating An Earth Formation, filed on Dec. 18, 1984 bearing U.S. Ser. No. 682, 817 by Michael P. Ekstrom et al and assigned to the same assignee as for this application.

In such image log sediment features which are on the scale of millimeters can be observed as illustrated at display log 20 in FIG. 1. Although the display log 20 is effective in providing a fine detailed resistivity presentation of a borehole wall, the expanded scale provides an enormous amount of material for analysis. Hence, techniques are needed to enable an automatic reliable analysis or detection of features of interest. For example, the thickness of beds such as 22, their inclination angle, the frequency of occurrence of the beds may need to be automatically determinable to enable a geologist to select particular regions of interest.

Improvements in an automatic analysis can be obtained by providing clear, relatively noise-free resistivity data. Although the aforementioned copending application describes an invention which is effective in removing noise from the raw electrode data, some noise remains as can be seen, for example, at 24 in the form of vertical streaks and irregular boundaries between beds. It is, therefore, one object of the invention to enhance such fine resistivity measurements to enable their automatic analysis and enhance their visual presentation.

SUMMARY OF THE INVENTION

With one technique in accordance with the invention data representative of an earth formation investigation from inside a borehole is smoothed in a particular manner without the blurring of features. These features may then be more reliably detected in an automatic manner.

This is obtained by smoothing investigation measurements in preferential directions that correspond to the orientation of certain features. Thus, for example, when a resistivity investigation is made using the techniques described in the aforementioned patent to Gianzero et al, arrays of resistivity measurements are made which, when displayed, exhibit successive contrasting beds corresponding to different sediment layers. The invention measures the orientations of these beds and then smoothes the resistivity measurements along directions which lie along the measured orientations.

With a preferential smoothing technique in accordance with the invention, the boundaries between adjacent beds are preserved while noise streaks are removed. Hence, automatic detection techniques can be employed to identify beds or fractures and dip angles of the beds.

One such automatic technique detects the boundaries between adjacent layers of different resistivity and may provide a visual indication of the boundaries on a display of the smoothed resistivity measurements. In another technique detected boundaries that do not laterally extend along the entire display are deleted from the display to simplify it and enhance its clarity.

As described herein for one embodiment in accordance with the invention the measurements obtained with a technique as described in the aforementioned patent application to Ekstrom et al are assembled as an array of pixels. The pixels in this invention may represent current or resistivity. As decribed in the embodiments each pixel has a magnitude representative of the resistivity at a particular depth and lateral position of a contiguous borehole wall zone. The pixels, though they are stored in a memory, can be considered as being positioned in columns, along the depth or borehole axis, as well as in rows along a lateral dimension which extends circumferentially along the borehole wall.

Sub-arrays of pixels, called windows, are selected, with the pixels located at intersections of columns and rows. The pixels in the sub-arrays are subjected to a semblance analysis as a function of different slopes of lines that cross the windows. The optimum slope values that yield the best semblance are then determined for each window position and the pixel values, referred to as profile values, that lie along the lines of optimal slope are smoothed along the optimal slope lines. These smoothed profile values are then used in the sub-array to which they relate to determine, by a linear interpolation technique, smoothed pixel values at the original positions in the array, i.e. at the intersections of columns and rows. The smoothed pixel values are used to replace the original pixel values at the intersections.

Since the windows overlap both in the lateral and depth directions, a large number of smoothed pixel values for any one intersection are generated. These are combined to produce a final smoothed pixel value so that the process produces a preferentially smoothed set of pixel values. These may then represent the resistivity measurements with substantially reduced noise while preserving the distinctiveness of the edges or boundaries of successive beds or layers of different resistivity values. A display of the smoothed pixel values provides a visually enhanced image of the beds, to clearly reveal their inclination angles and their frequency of occurrence.

A further signal processing of the preferentially smoothed pixel values may advantageously automatic detection and recording of the boundaries of different resistivity layers or such other analyses as may be deemed desirable such as a measurement of dip angles.

A technique in accordance with the invention may be used to preferentially smooth other measurements such as made in seismic or land surface or material investigations. For example, pixel values representative of the values of a characteristic of a medium can be processed in accordance with the invention to smooth boundaries of features. These features may then be displayed in a less cluttered manner and can be automatically detected.

It is, therefore, an object of the invention to provide a method and apparat s for producing preferentially smoothed measurements from a borehole investigation for automatic analysis or for an enhanced visual display in which noise is substantially reduced without a concommitant slurring of significant features. It is a further object of the invention to provide a method and apparatus with which fine resistivity measurements along a zone of a borehole wall are smoothed while the distinctiveness of boundaries between successive layers of different resistivities is preserved.

It is still further an object of the invention to provide a method and apparatus for smoothing measurements of a characteristic of a medium to accentuate the boundaries of significant features for display as well as their automatic detection.

These and other objects and advantages of the invention can be understood from the following detailed description of several embodiments described in conjunction with the drawings.

BRIEF DESCRIPTION OF THE DRAWINGS

FIG. 1 is a schematic, flow diagram and display of a smoothing and boundary detection technique in accordance with the invention;

FIGS. 1A and 1B are related portions of a display generated with the technique of FIG. 1;

FIG. 2 is a flow diagram of a generalized technique in accordance with the invention;

FIG. 3 is a flow chart and diagram for a technique in accordance of the invention for smoothing resistivity measurements in preferential directions;

FIGS. 4 and 5 are particular steps for sensitizing measurements prior to a similarity investigation;

FIG. 6 is a block diagram of a semblance measuring technique;

FIG. 7 is a flow diagram and display for a technique in accordance with the invention to automatically detect and display the boundaries of layers of different resistivities;

FIG. 8 is a diagram for illustrating one of the steps in the technique of FIG. 7;

FIG. 9 is a flow chart of particular steps employed in detecting the boundaries.

DETAILED DESCRIPTION OF THE DRAWINGS

Figure 10:
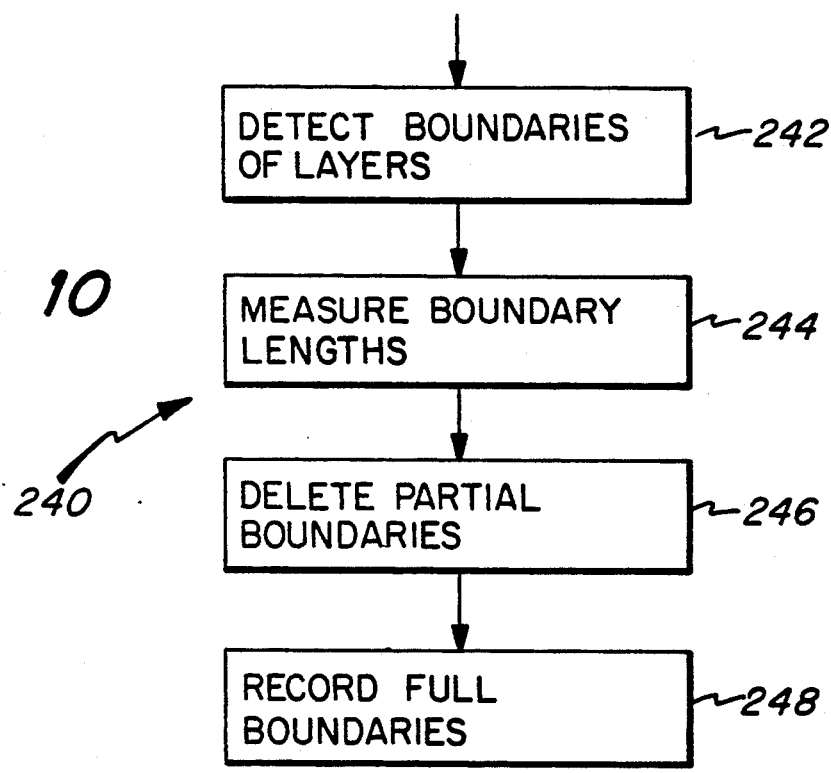
FIG. 10 is a more detailed flow diagram of steps used to produce one of the displays shown in FIG. 7.

With reference to FIG. 1 a borehole investigation tool 30 is shown suspended from a cable 32 inside a borehole 34 penetrating earth formation 36. Tool 30 measures formation characteristics along the borehole axis and the measurements are transmitted up-hole along cable 32 to surface located equipment such as a signal processor generally indicated at 38. Measurements may be recorded at the surface and then further processed at a remotely located signal processor 38. For illustrative purposes all of the processing steps are indicated in FIG. 1 as occurring at the head of borehole 30.

In the embodiment of FIG. 1 tool 30 is of the type as shown and described in the aforementioned patent to Gianzero et al with a plurality of pads 40, 40' on which arrays 42 of button sized electrodes 44 are located. The electrodes 44 inject currents into the wall 46. The electrical button currents are measured with downhole equipment in tool 30. The buttons 44 are in separate rows and so effectively overlap that the discrete current measurements provide an investigation of a contiguous zone of the borehole wall 46 as tool 30 is moved along the borehole 34.

The button electrodes are small, of the order of 5 mm in diameter, and as a result enable a detailed investigation of the borehole wall with a resolution that permits the recognition or features as small as several millimeters.

The button current measurements are converted to resistivity by dividing the measurements by the potential VMEX of the electrodes 44. This potential usually measured relative to a tool or surface located electrode 48. The conversion is carried out in a preprocessing section 50 in a manner as more particularly described and incorporated herein by reference in the aforementioned patent application to Ekstrom et al.

When the raw resistivity data are plotted on a display as shown at 52 the display includes noise and sawtooth patterns attributable to a number of factors, one of which is depth variations of the tool 30 during logging. A measurement of the depth of tool 30 is made, both at the surface at 54 and at tool 30 as described in the aforementioned Ekstrom et al patent application.

The preprocessor section 50 provides a depth correction to the resistivity measurements which, when displayed as at 56, provides a substantially enhanced display. However, the display 56 still exhibits vertical streaks and substantial noise that requires further preprocessing in the manner described in the aformentioned Ekstrom et al patent application. This additional preprocessing in section 50 involves normalizing and equalizing of the resistivity data to produce a display log such as 20.

Display log 20 is formed, like displays 52 and 56, of grey-level pixels of resistivity measurements, with the grey scale of each pixel representing the measurement made with an electrode 44. The density of the resistivity measurements is so high that the individual pixels are not readily visible except with a magnifying glass. The visual pixels typically are formed in a digital photographic process using an array of optical fibers in an equipment that is commercially available. In the display logs shown herein the darker the region, the higher the resistivity value though this can be reversed.

Display log 20 is still encumbered with noise that runs in vertical streaks such as at 24 and shows up with irregularities along the boundaries of some of the layers 22 such as at 60. This noise makes it more difficult to employ signal processing techniques to analyze the measurements while such automatic analysis is needed in view or the fine scale involved in the display as shown at 62. In effect about several orders of magnitudes of additional information is generated per unit depth in comparison with conventional logs on which the smallest increment is several feet, thus creating a wealth of information available to the geologist.

With the technique shown in FIG. 1 the display log 20 can be further improved with a preferentially directed smoothing. This involves commencing at 70 with the formation of pixel values, representative of resistivity measurements, as described in the aforementioned patent application to Ekstrom et al. The pixel values are each associated with a particular depth and with a specific lateral position along a circumferential zone of the borehole wall opposite the array 42 from which the measurements were derived.

At 72 a search is made for each pixel value as to the direction of greatest amount of similarity. Such determination would result, for example, in the detection of preferential directions such as suggested by arrows 74, 74' and 74" in FIG. 1A for correspondingly associated regions of like resistivity.

Once the directions 74 are found, the pixel values are smoothed at 76 in these directions, thus avoiding blurring of edges such as 78 between layers 22, 22' as illustrated in FIG. 1B.

The smoothed pixel values may then be recorded at step 79 in memory or in the form of a visual display log 80. This display shows substantial reduction of noise from the display log 20 while preserving the distinctiveness of the boundaries between layers. A lateral expansion or magnification of display log 80 is shown at 82 and may be formed in the manner as described in the copending patent appleation to Ekstrom et al.

With the preferentially smoothed pixel values automatic processing or analysis techniques can be employed. For example at step 86 the boundaries or edges of the layers 22 are detected. These detected edges are recorded in a display log such as 88 for each detected edge 78. The edges 78 are recorded in display log 88 with increased emphasis as dashed darkened lines 92.

Since edges 78 are detected at step 86, the cluttered appearance of display log 88 can be improved as shown with display log 94 by removing for example, the partial lines 92. A technique for doing this will be described with reference to FIG. 10. Note the significantly enhanced clarity of display log 94 in comparison with display log 20.

The preferential smoothing technique of FIG. 1 can be applied to other investigations. This is illustrated in FIG. 2 where at 100 pixel measurements are formed.

At 102 the directions of best resemblance are determined and the pixel measurements are smoothed along the directions of best resemblance at 104.

With reference to FIG. 3, a smoothing technique in accordance with the invention is illustrated in greater detail. At step 70 an array of pixel resistivity measurements is formed in the manner as previously described with respect to FIG. 1. These pixel values are typically stored in some orderly sequence in a memory but for purposes of clarity are referred to as being positioned as a function of depth and laterally along a zone as shown in the partial display log 110 adjacent step 70 in FIG. 3.

At 112 the equivalence of centering a window 114 on a pixel is done by selecting a sub-array 116 of pixel values 118 such as a 3×3 matrix. The window or sub-array is centered on the center pixel 118.1. The window 114 is initially set at the beginning of the pixel array and is positioned here at another location for illustrative purposes.

The size of the window, or the number of pixel values in the sub-array 116 preferably should be so chosen that within a window there are primarily parallel linear features in the image. If the window is too large, curved and non-parallel features are likely to introduce errors in the estimation of the directions of orientation of layers. If the window is too small, the estimated direction will be sensitive to noise.

The number of pixel values in the sub-array 116, can thus be varied from the 3×3 matrix as shown and in fact usually is larger, for example a 7×7 sub-array. The sub-array may be formed of even numbers of rows, m along depth dimension i, or columns n along lateral dimension j. The pixel values 118 are deemed to be normally positioned at the intersections of the rows m and columns with the distances between columns and rows known.

At step 120 a range for different parallel slope lines 122 is selected between a maximum $S_{max}$ and a minimum $S_{min}$ along which similarity tests are to be made. The line 122 may for example extend from slope values equivalent to angles A from $+75°$ to $-75°$, where the angle A is measured relative to a plane that is transverse to the borehole axis. The maximum value for angle A is primarily determined to avoid smoothing along the directions of the noise streaks such as 24 shown in display log 20. Thus if these streaks are exclusively at ninety degrees to the depth direction, the angle A can be increased to approach that, say about 85°, thus enabling the preferential smoothing of highly angled significant features without interference from the highly directional noise streaks.

At 124 a variable for the slope, s, for lines 122 is set to the minimum level and at 126 a set of parallel lines 122 is defined with respect to the selected sub-array 116 and having a slope s. The set of parallel lines 122 is so located that each passes through a center column pixel position corresponding to the column $j_o$.

At 128 profile values f, at predetermined intersections such as the intersections 130 of slope lines 122 with the columns n in which the pixel values 116 are located, are calculated. These profile values are in essence pixel values but for different positions in sub-array 116 and are, therefore, referred to as profile values f. The profile values are determined by a linear interpolation technique that assumes that the intersection of a line 122 with a column has a profile value that is directly proportional to the distance of that intersection from adjacent pixel values in the column n.

Note that for intersections such as 130.1 and 130.6 the interpolation technique utilizes pixel values 118 from outside the selected sub-array 116.

Since the profile values f in a sub-array 116 are likely to be close in value, a similarity determination should focus on those portions of the profile values that are likely to be different and thus render the similarity test more sensitive. Hence, at 136 the profile values f in the sub-array are sensitized.

Commencing at step 136 the profile values f are sensitized by demeaning as shown at 140 in FIG. 4. Such demeaning step may involve the calculation as shown at 142 in FIG. 5 and is done with a much greater number of profile values than in the sub-array 116. The profile values obtained over an extended depth interval are thus saved for such demeaning process. The sensitized profile values F are then used to determine the degree of similarity at 144.

The similarity test 144 may be a test for semblance SM between the demeaned profile values F for slope S using the test for semblance as shown at 146 in FIG. 6 and is the ratio of the square of the sums of demeaned column profile values F over the sum of the squares. The semblance value SM falls in the range between zero and one and would be equal to one if all profile values are equal to one another.

A test for a semblance value that is at least larger than a threshold level SM is made at 150 in FIG. 3. This threshold requirement assures that a satisfactory optimal slope line can be found as indicative of the direction in which the profile values best resemble each other. The semblance threshold can be set at a value that is equal to two divided by the number of columns when the noise in the pixel values can be modeled as uncorrelated Gaussian noise.

At 152 a test is made whether a semblance measurement has been made for the entire slope range. If not, the slope value s is incremented at 154 and a return is made to step 126. The slope increments may be for example, set at ten degrees, though, when necessary other incremental values can be used. When semblance measurements have been made for all slope values s, the optimal slope $S_o$ is determined at 160 as the slope value that yielded the best semblance SM. The profile values f associated with the optimal slope lines $L_o$ are then selected at 162 and the profile values f that lie along these lines are smoothed at 164.

The smoothing step 164 first produces a simple average value f* at 166 for the profile values along the optimal slope lines $L_o$. The average value is then substituted for each of the profile values along that optimal slope line as shown at 168. The substituted smoothed profile values are converted at 170 to smoothed pixel values 172 corresponding to the row and column intersections as shown at 116 by using the linear interpolation technique as previously described. The smoothed pixel values are then stored for accumulation and for smoothing with other pixel values for the same locations is determined for different window positions.

A test is then made at 180 whether all lateral window positions have been processed to determine the direction of best resemblance. If not, the window is shifted with overlap at 182 and a return is made to step 120. The amount of shift of a window is selected to provide sufficient smoothing and generally an overlap of at least about 50% is used. Preferably, the window 14 is shifted by one column spacing so that the window is centered on successively laterally spaced pixel positions.

Once test 180 indicated that all lateral window positions have been processed, the entire process is repeated at 184 for the next pixel depth or adjacent pixel row m. Hence, in the processing of the technique of FIG. 3, previously smoothed and stored pixel values for the same location are combined with each other to form a final smoothed pixel value for each intersection. In a window which, for example is made up of a sub-array of seven by seven pixel values, a total of forty-nine smoothed pixel values are combined by averaging at 185 to form one single final value for each pixel position in the window. As a result a fully smoothed array of pixel values is generated. The latter finally smoothed pixel values may then be recorded at 186 in a memory or on a plotter to form visual preferentially smoothed display logs 80 or 82 as shown in FIG. 1 in which the sharpness of the edges between different resistivity layers 22 is preserved.

With a preferentially smoothed array of pixel values in accordance with the invention one can detect the edges or boundaries between successive layers of different resistivity. This can be done with the technique shown in FIGS. 7,8, and 9. Thus commencing at 200 a maximum gradient line 202 is found for each lateral smoothed pixel value 172. This maximum gradient line is defined as being orthogonal to the optimal slope line $L_o$ which passes through pixel 172.0 in FIGS. 9 and identifies the direction of best resemblance. Hence gradient line 202 has a slope equal to $-1/S_o$.

Profile values g are then determined at 204 as those smoothed pixel values where the gradient line 202 intersects the rows m. These profile values g can be derived with a linear interpolation technique using the adjacent smoothed pixel values such as 172.1 or 172.2 on the same row m.

Once five profile values g are known, i.e. two on each side of the center $g_o$, which is equal to the smoothed pixel value 172.0, a search is made at 206 whether pixel 172.0 represents an edge. This depends upon whether pixel 172.0 represents a point of maximum change or an inflection. If so a recording to that effect is made at 208 for the center pixel position either in a memory or on a display log such as 82 or 94. The visual indication is made with heavy darkened emphasis as illustrated at 92 in display log 94.

The search for a maximum change along the gradient line is obtained with a mechanism illustrated in FIG. 9 and as explained with reference to FIG. 8. At 220 a test is made whether the absolute difference between the profile values $g_1$ and $g_{-1}$ is greater than the absolute difference between $g_2$ and $g_0$. For gradient line curve 222 the answer would be yes, but for curve 224 the answer would be no and the process of FIG. 7 would be repeated by proceeding to the next pixel at 226.

Another test 228 is then entered for a gradient line curve 222 as to whether the absolute difference between $g_1$ and $g_{-1}$ is greater than the absolute difference between $g_0$ and $g_{-2}$. For curve 222 the answer would be positive so that an inflection can then be recorded at 208 for the center pixel 172.0.

FIG. 10 illustrates a technique 240 for simplifying the edge indications such as in a display log 88 as shown in FIG. 7. The boundaries of different resistivity layers are detected at 242 using the steps of FIG. 7. The lengths of each boundary is measured at 244 and those that do not extend in a continuous manner laterally across the array, i.e. the partial boundaries, are deleted at 246. The remaining boundaries or edges are then recorded to form at 248 a less cluttered visual display log 94.

Having thus described several embodiments of the invention for smoothing an image representative of an investigation of an earth formation from inside a borehole, the advantages of the invention can be appreciated. Variations from the description and draings can be made without departing from the scope of the invention. For example, the parallel features in the borehole measurements may be along a time scale.

What is claimed is:

1. A borehole investigation method for smoothing measurements made with a tool from inside a borehole penetrating an earth formation, comprising the steps of:

defining for said measurements a plurality of successively-placed sub-arrays of measurements made at successive borehole depths and related to successive lateral positions;

determining semblance values indicative of the resemblance of the measurements in respective sub-arrays as a function of a direction within a range of directions;

selecting from the semblance values the directions in which the measurements within sub-arrays best resemble each other; and smoothing measurements within sub-arrays along respective directions of best resemblance.

2. A borehole investigation method for smoothing resistivity measurements made with an array of electrodes mounted on a pad that is pressed against the wall of a borehole wherein the array is formed of a plurality of electrodes from which discrete current measurements along a contiguous circumferential zone of the borehole wall are derived to provide pixel values indicative of the resistivity of discrete areas in the zone to determine features such as fine beds, layers and fractures of the zone; comprising the steps of:

defining for said resistivity measurements a plurality of successively placed sub-arrays of pixel values related to successive borehole depths and to circumferentially successive electrode positions in the zone;

determining semblance values indicative of the resemblance of the pixel values in respective sub-arrays as a function of directions along the borehole and circumferentially along the zone;

selecting from the semblance values the directions by which the pixel values within sub-arrays best resemble each other;

smoothing the pixel values that lie along said selected directions; and recording said smoothed pixel values.

3. The method for smoothing resistivity measurements as claimed in claim 2 and further including the step of detecting boundaries between adjacent regions of said smoothed pixel values of different resistivity and recording said detected boundaries.

4. The method as claimed in claim 3 wherein the boundaries detecting step comprises the steps of:

determining lateral pixels;

defining for each lateral pixel a line indicative of the highest gradient of pixel values within the sub-array of pixels associated with the lateral pixel;

determining profile values associated with the line of highest gradient; and determining the occurrence of an inflection along the latter profile values.

5. The method as claimed in claim 4 and further comprising the step of:

producing a visual display of smoothed measurements with a visually emphasized recording of said inflection placed on the display.

6. The method as claimed in claim 2 wherein the recording step comprises the step of forming a visual display on which the pixel values are recorded with a grey scale that is effectively proportional to the measured resistivity.

7. The method as claimed in claim 2 wherein the defining step comprises the step of:

selecting sub-arrays of pixels representative of windows of pixels positioned in columns and rows with predetermined spacing therebetween, wherein said semblance values determining step includes defining a set of parallel lines of predetermined slope passing through the window sub-arrays of pixels and determining profile values at predetermined column intersections of the parallel lines in the array;

deriving semblance values for the profile values lying along parallel lines;

repeating said defining, profile determining and semblance values deriving steps for different sets of parallel lines of respectively different predetermined slopes within a range of slope values;

selecting the optimal slope associated with the highest semblance value as the slope which yields the best similarity between the profile values to determine the direction along which the pixel values best resemble each other for the selected sub-array of pixels; and selecting successive sub-arrays of pixels with circumferential overlap along the zone and with overlap as a function of depth, and repeating said steps.

8. The method as claimed in claim 7 wherein the smoothing step comprises the steps of:

smoothing the profile values located along each line in the set of lines having said optimal slope; and determining smoothed pixel values, at the intersection of columns and rows, from the smoothed profile values; and replacing pixel values indicative of the resistivity values with correspondingly positioned smoothed pixel values.

9. The method as claimed in claim 8 wherein the profile smoothing step comprises the steps of:

combining profile values along each line in the set of lines having said optimal slope to determine smoothed profile values respectively for said lines of optimal slope; and replacing the profile values associated with said lines of optimal slope with said respective latter smoothed profile values.

10. The method as claimed in claim 8 including the step of determining an average of the profile values along respective lines of said optimal slope.

11. The method as claimed in claim 7 and including the step of sensitizing the profile values prior to said semblance value deriving step.

12. The method as claimed in claim 11 wherein the sensitizing step comprises the step of demeaning the profile values prior to said semblance value deriving step.

13. The method as claimed in claim 12 wherein the demeaning step comprises the steps of determining a common value for the profile values over an extended depth interval and removing the common value from the profile values determined for the sub-arrays.

14. The method as claimed in claim 2 wherein the defining step includes the step of:

selecting sub-arrays of pixel values which are representative of resistivity values at intersections of electrode determined columns and rows of the zone of the borehole wall, with adjacent sub-arrays overlapping each other by a predetermined amount;

and wherein the smoothing step includes the steps of:

generating smoothed pixel values for the pixel values in the sub-arrays; and combining smoothed pixel values associated with the same location in the array of pixel values and generated as a result of the overlap of said sub-arrays to produce final smoothed pixel values.

15. The method as claimed in claim 14 wherein adjacent sub-arrays have centers which are spaced from each other by either a column or a row or a column and a row.

16. The method as claimed in claim 14 wherein the combining step comprises the step of averaging the smoothed pixel values associated with the same location but determined by the processing of pixel values within a region of said overlap between sub-arrays.

17. The method as claimed in claim 16 wherein adjacent sub-arrays overlap each other by at least about 50%.

18. An apparatus for smoothing measurements made with a tool from inside a borehole penetrating an earth formation comprising:

means for generating semblance values indicative of the resemblance of measurements in sub-arrays as a function of direction within a range of angular directions defined by at least one set of lines of predetermined slopes;

means for deriving, from the semblance values, the directions for which the measurements within sub-arrays best resemble each other; and means for smoothing said measurements along said latter directions.

19. A borehole apparatus for smoothing resistivity measurements made with an array of electrodes mounted on a pad that is pressed against the wall of a borehole penetrating an earth formation wherein the array is formed of a plurality of electrodes from which discrete current measurements along a contiguous circumferential zone of the borehole are derived to provide pixel values indicative of the resistivity of discrete areas in the zone for display in a visually continuous pattern to reveal features such as fine beds, layers and fractures of the zone comprising:

means for determining semblance values indicative of the resemblance of the pixel values in sub-arrays as a function of direction along the borehole and circumferentially along the zone;

means for determining from the semblance values the directions by which the pixel values best resemble each other; and means for smoothing the pixel values that lie along said determined directions to form a display log with said smoothed pixel values.

20. The apparatus as claimed in claim 19 and further including:

means for detecting boundaries between adjacent regions of smoothed pixel values of different resistivity.

21. The apparatus as claimed in claim 19 wherein said semblance values determining means comprises:

means for sequentially selecting sub-arrays of pixel values wherein the sub-arrays overlap each other;

means for determining profile values at predetermined intersections of columns of sub-arrays and of lines of predetermined slope passing through the sub-arrays;

and wherein the means for determining directions of best resemblance includes means for determining the degree of similarity between the profile values for each sub-array and slope; and means for selecting for each sub-array the optimal slope yielding the best similarity between profile values.

22. The apparatus as claimed in claim 21 wherein the smoothing means smooths the profile values lying along the optimal slope and includes:

means for determining, from the smoothed profile values, smoothed pixel values for predetermined locations in each sub-array.

23. A method for forming a display of an investigation of a borehole penetrating an earth formation with a tool moved along the borehole and having at least one pad that is pressed against the wall of the borehole and employs an array of electrodes on the pad wherein the array is formed of a plurality of electrodes from which discrete current measurements along a contiguous circumferential zone of the borehole wall are derived to provide an array of pixel values indicative of the resistivity of discrete areas in the zone comprising the steps of:

defining for said resistivity measurements a plurality of successively placed sub-arrays of pixel values related to successive borehole depths and to circumferentially successive electrode positions in the zone;

determining semblance values indicative of the resemblance of the pixel values in respective sub-arrays as a function of directions along the borehole and circumferentially along the zone;

determining, from the semblance values, the directions by which the pixel values within sub-arrays best resemble each other;

smoothing the pixel values that lie along said determined directions; and forming a display log with said smoothed pixel values.

24. The method of forming a display as claimed in claim 23 wherein the step of determining directions of best resemblance includes the steps of:

selecting sub-arrays of pixel values which are representative of resistivity values at intersections of columns and rows for the display, with adjacent sub-arrays overlapping each other along borehole depths and along the zone by a predetermined amount;

determining for each sub-array a direction of best similarity of the pixel values;

and wherein the smoothing step includes the steps of:

generating smoothed pixel values for the pixel values in the sub-arrays;

combining smoothed pixel values associated with the same location in the array of pixel values and generated as a result of the overlap of said sub-arrays to produce final smoothed pixel values; and wherein the display log forming step includes the step of visually recording said final smoothed pixel values.

25. A method for smoothing measurements comprising the steps of:

determining semblance values representative of the degree by which the measurements resemble each other along different directions within a range of directions defined by at least one set of lines of predetermined slopes, selecting directions for which semblance values are indicative of the best resemblance of the measurements; and smoothing said measurements that lie along directions of best resemblance.

26. The method as claimed in claim 25 wherein said determining step determines the semblance values along directions which are a function of spatial dimensions.

27. The method as claimed in claim 26 wherein the measurements characterize features of a medium and wherein said direction selecting step selects the orientations of said features.

28. The method as claimed in claim 27 wherein said semblance values determining step determines semblance values over a range of orientations of said features within an angle of about seventy-five degrees from a predetermined plane.

29. The method as claimed in claim 25 wherein said determining step determines semblance values as a function of time and space.

30. A borehole investigation method for smoothing measurements made with an array of transducers from which discrete measurements along a contiguous zone are derived to provide pixel values indicative of measurements of a characteristic of discrete areas on the zone to determine features, comprising the steps of:

defining a plurality of successively placed sub-arrays of pixel values wherein the sub-arrays extend in a borehole-depth direction and along the zone in correspondence with said transducers;

determining semblance values indicative of the resemblance of pixel values in respective sub-arrays as a function of directions along the borehole and along the zone;

determining, from the semblance values, the directions by which the pixel values in the sub-arrays best resemble each other;

smoothing the pixel values that lie along said direction of best resemblance within respective sub-arrays; and recording said smoothed pixel values.

31. The method for smoothing measurements as claimed in claim 30 and further including the step of detecting boundaries between adjacent regions of pixel values of different values of the characteristic and recording said detected edges.

32. The method as claimed in claim 30 wherein the recording step comprises the step of forming a visual display on which the pixel values are recorded with a grey scale that is effectively proportional to measured resistivity.

33. The method as claimed in claim 30 wherein the defining step comprises the step of:

selecting sub-arrays of pixels representative of windows of pixels positioned in columns and rows with predetermined spacings therebetween, and wherein said semblance values determining step includes defining a set of parallel lines of predetermined slope passing through the window sub-arrays of pixels and determining profile values at predetermined column intersections of the parallel lines in the array;

deriving semblance values for the profile values;

repeating said defining, profile determining and semblance values deriving steps for different sets of parallel lines of respectively different predetermined slopes within a range of slope values;

selecting the optimal slope associated with the highest semblance values as the slope which yields the best similarity between the profile values as the direction along which the pixel values best resemble each other for the selected sub-arrays of pixels; and selecting successive sub-arrays of pixels with circumferential overlap along the zone and with overlap as a function of depth and repeating said steps.

34. The method as claimed in claim 33 wherein the smoothing step comprises the step of:

smoothing the profile values located along each line in the set of lines having said optimal slope; and determining smoothed pixel values at the column and row array positions from the smoothed profile values; and replacing pixel values indicative of the characteristic with correspondingly positioned smoothed pixel values.

35. The method as claimed in claim 34 wherein the profile smoothing step comprises the steps of:

combining profile values along each line in the set of lines having said optimal slope to determine smoothed profile values respectively for said lines of optimal slope; and replacing the profile values associated with said lines of optimal slope with said respective latter smoothed profile values.

36. The method as claimed in claim 34 including the step of determining an average of the profile values along respective lines of said optimal slope.

37. The method as claimed in claim 33 and including the step of sensitizing the profile values prior to said semblance value deriving step.

38. The method as claimed in claim 37 wherein the sensitizing step comprises the step of demeaning the profile values prior to said semblance value deriving step.

39. The method as claimed in claim 38 wherein the demeaning step comprises the step of demeaning the profile values over an extended spatial interval that includes the zone.

40. An apparatus for smoothing measurements comprising:

means for generating semblance values indicative of the resemblance of measurements in sub-arrays as a function of direction with a range of angular directions defined by at least one set of lines of predetermined slopes;

means for deriving, from the semblance values, the directions in which the measurements within sub-arrays best resemble each other; and means for smoothing said measurements along said latter directions.

41. A borehole investigation method for smoothing measurements made with a tool from inside a borehole penetrating an earth formation, comprising the steps of:

defining for said measurements a plurality of successively-placed sub-arrays of measurements made at successive borehole depths and related to successive lateral positions;

determining semblance values indicative of the resemblance of the measurements in respective sub-arrays as a function of a direction within a range of directions along spatial dimensions that are a function of borehole depth and a direction transverse thereto;

selecting from the semblance values the directions in which the measurements within sub-arrays best resemble each other; and smoothing measurements within sub-arrays along respective directions of best resemblance.

42. The method as claimed in claim 41 wherein the measurements are characterized by features of the borehole wall as a function of depth and lateral spatial positions along the borehole wall and wherein said selecting step determines the orientations of said features.

43. The method as claimed in claim 42 wherein said determining step determines semblance values of features whose orientations lie within an angle of about seventy-five degrees from a plane that is substantially transverse to the borehole axis.

44. A borehole investigation method for smoothing measurements made with a tool from inside a borehole penetrating an earth formation, comprising the steps of:

defining for said measurements a plurality of successively-placed sub-arrays of measurements made at successive borehole depths and successive times and related to successive lateral positions;

determining semblance values indicative of resemblance of the measurements in respective sub-arrays as a function of a direction within a range of directions that are a function of borehole depth and time;

selecting from the semblance values the directions in which the measurements within sub-arrays best resemble each other; and smoothing measurements within sub-arrays along respective directions of best resemblance.

45. An apparatus for smoothing measurements made with a tool from inside a borehole penetrating an earth formation comprising:

means for generating semblance values indicative of the resemblance of measurements in sub-arrays as a function of direction within a range of angular directions;

means for deriving, from the semblance values, the directions for which the measurements within sub-arrays best resemble each other;

means for smoothing said measurements along lateral directions; and means for determining the boundaries of features characterized by said directions of best resemblance.

46. The apparatus as claimed in claim 45 and further including:

means for limiting a determination of best resemblance within a predetermined angular range relative to a plane that is substantially transverse to the borehole axis, with said angular range selected to exclude directional noise.

47. An apparatus for smoothing measurements comprising:

means for generating semblance values indicative of the resemblance of measurements in sub-arrays as a function of direction within a range of angular directions;

means for deriving, from the semblance values, the directions in which the measurements within sub-arrays best resemble each other;

means for smoothing said measurements along said latter directions; and means for determining the boundaries of features characterized by said directions of best resemblance.

48. The apparatus as claimed in claim 47 and further including:

means for limiting the determination of best resemblance within a predetermined angular range relative to a predetermined plane, with said angular range selected to exclude directional noise.

* * * * *